United States Patent
Kerres et al.

(10) Patent No.: US 6,723,757 B1
(45) Date of Patent: Apr. 20, 2004

(54) ENGINEERING IONOMERIC BLENDS AND ENGINEERING IONOMERIC BLEND MEMBRANES

(75) Inventors: Jochen Kerres, Ostfildern (DE); Andreas Ullrich, Esslingen (DE); Thomas Häring, Stuttgart (DE)

(73) Assignees: Universitat Stuttgart Lehrstuhl, Stuttgart (DE); Institut fur Chemische Verfahrenstechnik, Stuttgart (DE)

( * ) Notice: Subject to any disclaimer, the term of this patent is extended or adjusted under 35 U.S.C. 154(b) by 0 days.

(21) Appl. No.: 09/647,811

(22) PCT Filed: Apr. 16, 1999

(86) PCT No.: PCT/EP99/02755

§ 371 (c)(1),
(2), (4) Date: Feb. 9, 2001

(87) PCT Pub. No.: WO99/54407

PCT Pub. Date: Oct. 28, 1999

(30) Foreign Application Priority Data

Apr. 18, 1998 (DE) .......................................... 198 17 374

(51) Int. Cl.[7] .................................. C08F 8/32
(52) U.S. Cl. ........................... 521/27; 521/28; 525/203; 525/204; 525/376.6; 525/376.7; 525/376.9; 525/327.1; 525/340; 525/344
(58) Field of Search ..................... 521/27, 28; 525/203, 525/204, 340, 344

(56) References Cited

U.S. PATENT DOCUMENTS

| | | |
|---|---|---|
| 4,020,142 A | 4/1977 | Davis et al. |
| 4,842,740 A | 6/1989 | Chung et al. |
| 4,898,917 A | 2/1990 | Sansone |
| 5,008,339 A | 4/1991 | Anson et al. |
| 5,393,432 A | 2/1995 | Tsuyumoto et al. |
| 5,525,436 A | 6/1996 | Savinell et al. |
| 5,599,639 A | 2/1997 | Sansone et al. |
| 6,194,474 B1 * | 2/2001 | Kerres et al. .................. 521/27 |
| 6,300,381 B1 * | 10/2001 | Kerres et al. .................. 521/27 |

FOREIGN PATENT DOCUMENTS

| | | |
|---|---|---|
| DE | 4026154 | 2/1992 |
| DE | 19632285 | 2/1998 |
| EP | 0354040 | 2/1990 |

OTHER PUBLICATIONS

Cherdon, H., et al., "Miscible Blends of Polybenzimidazole and Polyaramides with Polyvinylpyrrolidone," *Journal of Applied Polymer Science*, 53:507–512 (1994).

Makhija, S., et al., "Miscibility Studies in Blends of Poly-benzimidazoles and Poly94-vinylpyridine)," Chemical Abstract No. 113:116308p (1990).

Chanda, M., et al., "Removal of Uranium from Acidic Sulfate Solution by Ion Exchange on Poly(4-vinylpyridine) and Polybenzimidazole in Protonated Sulfate Form," Chemical Abstract No. 117:30999 (1992).

* cited by examiner

*Primary Examiner*—Bernard Lipman
(74) *Attorney, Agent, or Firm*—Hunton & Williams LLP

(57) ABSTRACT

The present invention relates to novel compatible binary and ternary cation-exchanger polymer and anion-exchanger polymer blend membranes.

15 Claims, No Drawings

ENGINEERING IONOMERIC BLENDS AND ENGINEERING IONOMERIC BLEND MEMBRANES

The present invention relates to novel compatible binary and ternary cation-exchanger polymer and anion-exchanger polymer blend membranes.

The invention further relates to the use of such binary and ternary ionomer blend membranes in electromembrane processes, such as polymer electrolyte membrane fuel cells (PEFC), direct methanol fuel cells (DMFC), electrodialysis, and in other membrane processes, such as dialysis and inverse osmosis, diffusion dialysis, gas permeation, pervaporation and perstraction.

For ionomer membrane applications, such as polymer electrolyte membrane fuel cells (PEMFC), direct methanol fuel cells (DMFC), polymer electrolyte membrane electrolysis (PEM-E), a high chemical, mechanical and thermal stability of the membrane is necessary. The perfluorinated ionomer Nafion® (Grot, W. G.: Perfluorinated Ion-Exchange Polymers and Their Use in Research and Industry, Macromolecular Symposia, 82, 161–172 (1994)) is the only commercially available ionomer to date to meet the high requirements of chemical, mechanical and thermal stability (Ledjeff, K.; Heinzel, A.; Mahlendorf, F.; Peinecke, V.: Die reversible Membran-Brennstoffzelle, Dechema-Monographien Band 128, VCH Verlagsgesellschaft, 103–118 (1993)). However, it has various disadvantages which necessitate the search for alternative materials: It is very expensive (DM 1400.–/m$^2$). The very complex production process comprises highly toxic intermediates (see Grot, W. G.). The environment-compatibility of Nafion® is to be evaluated critically: as a perfluorinated polymer, it is hardly degradable. The recyclability of Nafion® is questionable.

When applying Nafion® in direct methanol fuel cells (DMFC), it was discovered that it shows a very high methanol-permeability, especially when pure methanol is used (Surampudi, S., Narayanan, S. R.; Vamos, E.; Frank, H.; Halpert, G.; LaConti, A.; Kosek, J.; Surya Prakash, G. K.; Olah, G. A.: Advances in direct oxidation methanol fuel cells, J. Power Sources, 47, 377–385 (1994)), which greatly reduces the energy efficiency of the DMFC by mixed potential formation.

Possible alternative materials to the perfluorinated ionomers are arylene main chain ion-exchanger polymers, such as sulfonated polyethersulfone (Nolte, R.; Ledjeff, K.; Bauer, M.; Mülhaupt, R.: Partially Sulfonated poly(arylene ether sulfone)—A Versatile Proton Conducting Membrane Material for Modern Energy Conversion Technologies, Journal of Membrane Science 83, 211–220 (1993)) and sulfonated poly(etheretherketone) (Helmer-Metzmann, F.; Ledjeff, K.; Nolte, R., et al.: Polymerelektrolyt-Membran und Verfahren zu ihrer Herstellung, EP 0 574 791 A2), which have a disadvantage, however, in that they exhibit a high brittleness when drying out, which is unfavorable when used, for example, in membrane fuel cells.

Searching for polymers with high thermal and mechanical stability leads one to find polyimides, imidazole containing polymers and benzimidazoles which show excellent thermal stabilities, such as the polybenzimidazole (PBI) poly[(2,2'-m-phenylene)-5,5'-bibenzimidazole] of general formula

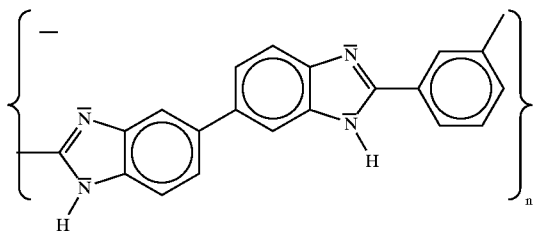

and the polyetherimide poly[2,2'-bis(3,4-dicarboxyphenoxy)phenyl-propane-2-phenylenebisimide] (Musto, P.; Karasz, F. E., MacKnight, W. J.: Fourier transform infra-red spectroscopy on the thermooxidative degradation of polybenzimidazole and of a polybenzimidazole/polyetherimide blend, Polymer, 34(12), 2934–2945 (1993)).

Polybenzimidazoles can be sulfonated by various methods. One possible way is the following sequence of reactions (Gieselman, M. B.; Reynolds, J. R.: Water-Soluble Polybenzimidazole-Based Polyelectrolytes):

1. Deprotonation of the imidazole N—H with LiH in DMAc;

2a. Reaction of the deprotonated polymer with propanesulfone to give the corresponding polybenzimidazole-N-propanesulfonate;

2b. Reaction of the deprotonated polymer with Na-4-(bromomethyl)-benzenesulfonate to give the corresponding polybenzimidazole-N-benzylsulfonate.

A patent describes another method for obtaining sulfonated polybenzimidazoles (Sansone, M. J.; Gupta, B.; Forbes, C. E.; Kwiatek, M. S.:

Sulfalkylation of Hydroxyethylated Polybenzimidazole Polymers, U.S. Pat. No. 4,997,892) which involves the following sequence of reactions:

1. Reaction of polybenzimidazole at the N—H group of the imidazole ring with ethylene carbonate in a dipolar-aprotic solvent, such as N-methylpyrrolidinone, to give the hydroxyethylated polybenzimidazole N—(CH$_2$)$_2$OH;

2. Deprotonation of the OH group of the hydroxyethylated polybenzimidazole with a suitable base to give the hydroxyethylated polybenzimidazole anion N—(CH$_2$)$_2$O$^-$;

3. Reaction of the hydroxyethylated polybenzimidazole anion N—(CH$_2$)$_2$O$^-$ with a sulfone, e.g., propanesulfone, to give the sulfoalkylated polymer N—(CH$_2$)$_2$O(CH$_2$)$_3$—SO$_3^-$.

It has been found that the excellent thermal stability of polybenzimidazoles is partially retained with these sulfonating methods (see Gieselman et al.). For some applications of the sulfonated polybenzimidazoles mentioned, such as their use in membrane fuel cells, it may be a disadvantage, however, that they contain —CH$_2$— groups which result in a lower oxidation stability than that of purely aromatic sulfonated polymers. In addition, the sulfonated polybenzimidazoles can form inner salts in their protonated form which reduce the proton conduction according to the following reaction scheme:

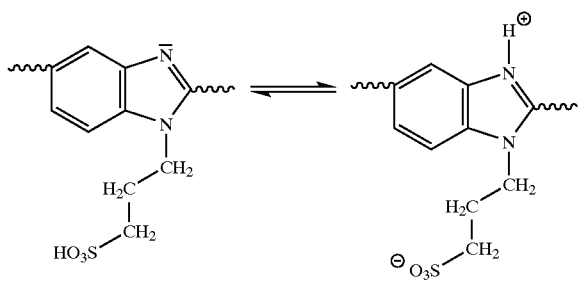

Further, the sulfonated polybenzimidazoles may lose part of their mechanical stability by interference of the substituent with the chain conformation.

Polybenzimidazole can be alkylated at both imidazole nitrogens by the following method to obtain an anion-exchanger polymer which may also be water-soluble (Hu, Ming; Pearce, Eli.M.; Kwei, T. K.: Modification of Polybenzimidazole: Synthesis and thermal stability of Poly($N_1$-methylbenzimidazole and Poly($N_1,N_3$-dimethylbenzimidazole), Salt Journal of Polymer Science: Part A: Polymer Chemistry, 31, 553–561, 1993):

1. Deprotonation of the imidazole N—H with LiH in DMAC or NMP to give the N—Li salt;
2. Alkylation of the Li salt≈N—Li with methyl iodide to give ≈N—$CH_3$;
3. Reaction of the methylated polybenzimidazole with an excess of methyl iodide at 80° C. to obtain poly($N_1$, $N_3$-dimethylbenzimidazplium)diiodide.

A disadvantage of this poly($N_1,N_3$-dimethylbenzimidazolium)iodide is its poor thermal stability (thermogravimetry: onset loss of weight at 180° C. (heating rate 10°/min)). This loss of weight can be explained by the cleavage of methyl iodide to form the monomethylated polybenzimidazole, which results in a loss of the anion-exchanger properties of the polymer.

In the patent literature a work claiming blends/mixtures of low-molecular non-aqueous amphoters and high-molecular acids (proton donors) or high-molecular amphoters and low-molecular acids is found (Kreuer, K. D.; Fuchs, A.; Maier, J.; Frank, G.; Soczka-Guth, Th.; Clauβ, J; Protonenleiter mit einer Temperaturbeständigkeit in einem weiten Bereich und guten Protonenleitfähigkeiten, DE 196 32 285 A1). Said amphoters are heterocyclic and heteroaromatic N-containing compounds including, among others, also imidazole or benzimidazole and imidazole or benzimidazole containing organic low-molecular, oligomer, or high-molecular compounds functioning as proton solvents, the acids being present in the system being the proton donors for the amphoters. "Proton solvent" indicates that the protons are directed by the molecules or groups of the amphoters.

In the application examples of DE 196 32 285 A1 only the preparation and characterization of blends of sulfonated polyetherketones and imidazole and/or pyrazole are quoted, the blends containing 10 imidazole and/or pyrazole molecules showing the best proton conductivities. The good proton conductivity of said blends is presumably due to the high mobility of the imidazole and/or pyrazole molecules within the polymer matrix. This high mobility of the low-molecular heterocycles involves the danger that said molecules possibly can be re-discharged from the acidic polymer matrix, in particular, if they are present in molar excess with respect to the acid groups and in particular at temperatures exceeding 200–250° C. (boiling temperature of imidazole: 256° C.; boiling temperature of pyrazole: 186° C.).

Examples of the proton conductivity of blends of polymers containing high-molecular polymeric acids and high-molecular imidazole or pyrazole groups are not given in DE 196 32 285 A1. The proton conductivity in the anhydrous state of blends consisting of polybenzimidazoles and polymeric sulfonic acids (for a proton conduction in the anhydrous state the imidazole component has to be present in molar excess) is supposed to be very low, if it exists at all, as the mobility of polybenzimidazoles, in particular if the imidazole groups are contained within the backbone chain, is much lower than the mobility of imidazole or pyrazole.

All sulfonated aryl polymers exhibit a high brittleness when drying out, for example, when they are applied in fuel cells at intermittent conditions. In addition, the thermal stability of the sulfonated aryl polymers is still worth improving. To conclude, the reduction in brittleness and the further increase in thermal stability of the sulfonated aryl polymer ionomer membranes must have priority in their further development for long-term application in PEM fuel cells, PEM electrolysis and other (electro)membrane processes in which the membranes are subjected to heavy-duty conditions.

The present invention provides acid-base polymer blends or acid-base polymer blend membranes which are characterized by excellent chemical, mechanical and thermal stabilities and which are composed of:

(1a) a cation-exchanger polymer, optionally with an aryl and/or heteroaryl polymer main chain, comprising $SO_3X$ moieties (X=any cation including hydrogen); or (1b) an anion-exchanger polymer with quaternary ammonium groups, pyridinium groups, imidazolinium groups, pyrazolinium groups, triazolinium groups, tetrazolinium groups etc.; and (2) polymers containing benzimidazole, imidazole, and/or other heterocyclic, especially heteroaromatic, nitrogen-containing basic moieties, especially oxazole, isoxazole, carbazole, indole, isoindole, thiazole, isothiazole, benzoxazole, benzothiazole, imidazolidine, indazole, 1,2,3-oxadiazole, 1,2,3-thiadiazole, 1,2,4-thiadiazole, 1,2,3-triazole, benzotriazole, 1,2,4-triazole, tetrazole, pyrrole, pyrrolidine, pyrrazole groups and optionally (for ternary ionomer blend membranes), in addition:

(3) other polymers containing primary, secondary or tertiary basic nitrogens, such as poly(4-vinylpyridine), poly(2-vinylpyridine), (block) copolymers containing poly(4-vinylpyridine) or poly(2-vinylpyridine), poly(sulfone-ortho-sulfone-diamine), poly(sulfone-ortho-ether-diamine), poly(aniline), poly(ethyleneimine).

Thus, the invention provides the following combinations:

binary blends: 1a-2 or 1b-2 ternary blends: 1a-2-3 or 1b-2-3

Surprisingly, it has now been found that mixing a polymeric sulfonic acid salt, for example, poly(ethersulfone lithium sulfonate), of the following formula

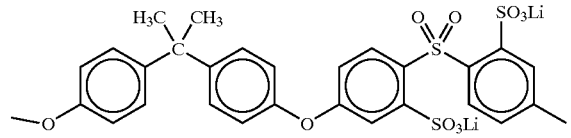

with 2 sulfonate groups per repeating unit; obtainable according to Kerres, J.; Cui, W.; Reichle, S.: New sulfonated engineering polymers via the metalation route. I. Sulfonated poly(ethersulfone) PSU Udel® via metalation-sulfination-oxidation, Journal of Polymer Science, Part A: Polymer Chemistry 34, 2421–2438 (1996), or
poly(etheretherketone lithium sulfonate) of the following formula

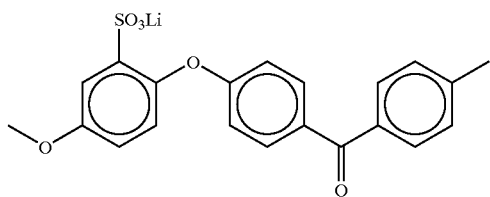

with one sulfonate group per repeating unit; obtainable according to Helmer-Metzmann et al., with only 3–25% by weight of the polybenzimidazole (PBI) Celazol® yields an ion-conducting polymer blend membrane which is characterized by the following properties:
- a large improvement in mechanical strength as compared to the respective pure polymeric sulfonic acid (the respective polymeric sulfonic acid salt);
- water-soluble polymeric sulfonic acid salts surprisingly lose their water-solubility upon mixing with PBI because of the interactions between the polymeric chains of the blend components (formation of hydrogen bonds);
- the blends of the polymeric sulfonic acids with PBI exhibit high thermal stability already at surprisingly low contents of PBI in the blend (3–10%), caused by proton transfer from the sulfonic acid to the basic polybenzimidazole nitrogen to form a polysalt, and by the high thermal stability of the PBI.

When aftertreating the blends consisting of sulfonic acid salt and PBI in a diluted mineral acid (e.g., 10% HCl or 10% $H_2SO_4$), according to the following reaction scheme ionic crosslinking bridges between the acidic and the basic blend components are formed due to a proton transfer to the basic N of the imidazole:

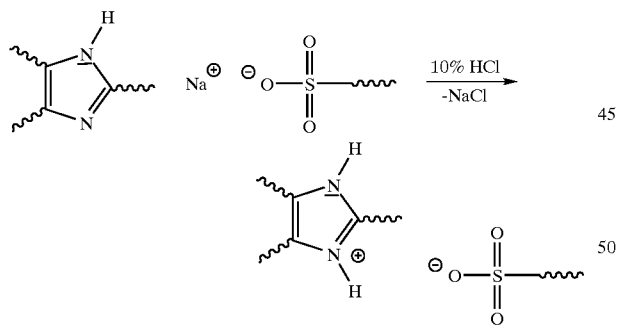

These ionic crosslinking bridges account for the high thermal and mechanic stability of the acid-base blends according to the invention.

The essential differences of the blends claimed in the present invention with respect to DE 196 32 285 are:
The blends according to the invention are used exclusively in aqueous media, i.e., in this case water is the ampholyte (see the application examples, where the proton conductivity or the proton resistance was measured in 0.5 molar aqueous HCl).
In the acid-base blends according to the invention the polymer containing imidazole, benzimidazole or other basic nitrogen-containing heterocyclic, especially heteroaromatic, groups serves exclusively as a base, i.e., ionic bonds to said base are formed by a proton transfer from the acid component. IR spectroscopic measurements revealed that the proton does not dissociate from the imidazole cation in the aqueous medium because the imidazole group is a strong base ($p_k^b$ about 9–10).
In the acid-base blends according to the invention the proton conduction takes place exclusively by the sulfonic acid groups of the acidic blend component. Therefore, in the present invention acid-base blends containing the acidic component in molar excess are preferred.
DE 196 32 285 A1 does not disclose binary anion exchanger blends of imidazole containing polymers and anion exchanger polymers and ternary blends. In particular, the blends of imidazole containing polymers, polymeric acids, and an additional basic polymer are very promising, as the mechanic and thermal stability of said blends can be improved further.
It has surprisingly been found that when ternary ionomer blend membranes are prepared from:
sulfonated PEEK/PSU
polybenzimidazole
aminated PSU,
these blends also exhibit very high mechanical stability and high thermal stability.
It is also possible to prepare PBI-containing anion-exchanger polymer blends and anion-exchanger polymer blend membranes, the PBI serving as a mechanically and thermally stabilizing component:
Thus, PBI can be dissolved in a dipolar-aprotic solvent together with poly(4-vinylpyridine). Then, a mixture of monofunctional and difunctional haloalkanes (for example, a mixture of 1,6-diiodohexane and 1-iodohexane) is added to the polymer solution. While the solvent is being evaporated, the pyridine nitrogen is alkylated to give the corresponding pyridinium salt, with partial cross-linking (by the difunctional haloalkanes, for example, 1,6,-diiodohexane). The halide anion remains as an exchangeable counter-ion in the anion-exchanger polymer formed.
Another type of anion-exchanger polymer blend membrane can be prepared by dissolving poly($N_1$,$N_3$-dimethylbenzimidazolium) iodide (11) and polybenzimidazole together in a dipolar-aprotic solvent, such as DMAc, NMP or DMSO, followed by evaporation of the solvent at elevated temperature.

EXAMPLE 1

Preparation of an Acid-base Blend from Sulfonated PEEK and PBI 10.067 g of a 20.16% solution of sulfonated poly(etheretherketone) (ion-exchange capacity of 1.8 meq $SO_3H$/g of polymer) and 26.8 g of a 1.875% solution of polybenzimidazole CELAZOL® (poly[2,2'-(m-phenylene)-5,5'-bibenzimidazole]) were mixed in N-methylpyrrolidinone.

This solution was used to knife-coat about a 300 μm thick film onto a glass plate. The solvent was evaporated at a temperature of 120–140° C. The glass plate with the thin polymeric film was placed in a trough with deionized water which caused the film to separate from the glass plate. The membrane was aftertreated first in 8% HCl at temperatures of 60–80° C. for 24 h and then in deionized water at temperatures of 20–80° C. for 24 h.

Characterization results:

Ion-exchange capacity: 1.06 meq $SO_3H$/g of polymer

Thickness: 20 μm

Swelling ($H_2O$, RT, $H^+$ form): 22.8%

Surface resistance (RT, $H^+$ form) 0.116 Ω·$cm^2$ (measured in 0.5 N HCl)

Specific resistance (RT, $H^+$ form): 58.125 Ω·cm

Thermal stability (by DSC, TGA): onset of decomposition: ≈350° C. (conditions: air, heating rate 20° C./min)

EXAMPLE 2

Preparation of Acid-base Blends from Sulfonated PSU and PBI

The PBI and the sulfonated PSU Udel® in the $SO_3Li$ form were combined into a homogeneous solution (data see Table 1). This solution was used to knife-coat about a 300 μm thick film onto a glass plate. The solvent was evaporated at a temperature of 120–140° C. The glass plate with the thin polymeric film was placed in a trough with deionized water which caused the film to separate from the glass plate. The membrane was aftertreated first in 8% HCl at temperatures of 60–80° C. for 24 h and then in deionized water at temperatures of 20–80° C. for 24 h.

with deionized water which caused the film to separate from the glass plate. The membrane was aftertreated first in 8% HCl at temperatures of 60–80° C. for 24 h and then in deionized water at temperatures of 20–80° C. for 24 h.

Characterization results:

Ion-exchange capacity: 0.93 meq $SO_3H$/g of polymer

Thickness: 54 μm

Swelling ($H_2O$, RT, $H^+$ form): 25.6%

Surface resistance (RT, $H^+$ form) 0.62 Ω·$cm^2$ (measured in 0.5 N HCl)

Specific resistance (RT, $H^+$ form): 114.82 Ω·cm

Thermal stability (by DSC, TGA): onset of decomposition: ≈300° C. (conditions: air, heating rate 5° C./min)

What is claimed is:

1. A process for the preparation of acid-base polymer blends or acid-base polymer blend membranes, characterized in that solutions of acidic polymers selected from the group consisting of polymeric sulfonic acids or sulfonic acid salts, polymeric phosphonic acids or phosphonic acid salts, polymeric carboxylic acids or carboxylic acid salts and combinations thereof and a polymer containing basic imidazole, benzimidazole or other heterocyclic, nitrogen-containing basic moieties, are reacted, optionally with the

TABLE 1

Data for the preparation and characterization of blend membranes made from sulfonated PSU and the polybenzimidazole (PBI) poly[2,2'-(m-phenylene)-5,5'-bibenzimidazole]

| membrane No. | PBI [g] | PSU [g] | PBI content of membrane [weight %] | capacity meq $SO_3H$/g of polymer | swelling [%] | $R_{a, H+}$ [Ω·$cm^2$] | $R_{sp, H+}$ [Ω·cm] |
|---|---|---|---|---|---|---|---|
| 58* | 0.25¥ | 2.7 | 8.5 | 2.087 | 118 | 0.107 | 6.56 |
| 60* | 0.357**** | 1.428 | 20 | 1.068 | 30.8 | 0.178 | 46.78 |
| 61* | 0.357† | 2.023 | 15 | 1.457 | 43.26 | 0.074 | 16.5 |
| 62* | 0.357- | 3.213 | 10 | 1.842 | 107.5 | 0.061 | 6.65 |
| 68* | 0.357 | 1.071 | 25 | 0.83 | 17.26 | 0.497 | 292.35 |
| 57** | 0.25 | 2.25*** | 10 | 0.46 | 8.75 | 0.718 | 194.05 |
| 69** | 0.357# | 7.14 | 5 | 1.12 | 14.56 | 0.119 | 51.85 |

¥dissolved in 13.75 g of NMP
*with water-soluble PSU, capacity 2.5 meq $SO_3H$/g
**with water-insoluble PSU, capacity 1.6 meq $SO_3H$/g
***as a 15% by weight solution in NMP
****as a 1.785% by weight solution
†as a 1.785% by weight solution, plus addition of 6.557 g of NMP
-as a 1.785% by weight solution, plus addition of 19.647 g of NMP
as a 1.785% by weight solution, plus addition of 50 g of NMP

EXAMPLE 3

Preparation of a Ternary Acid-base Blend From Sulfonated PEEK, PBI and Aminated PSU 22.5 g of a 20% by weight solution of sulfonated poly(etherether-ketone) (ion-exchange capacity of 1.9 meq $SO_3H$/g of polymer) in DMAc was mixed with 10 g of a 6.4% by weight solution of polybenzimidazole (PBI) CELAZOL® (poly[2,2'-(m-phenylene)-5,5'-bibenzimidazole]) in DMAC (PBI solution with addition of LiCl). Then, 10 g of a 15% by weight solution of poly(sulfone-ortho-sulfone-diamine) in NMP was also added to the polymer solution, and stirring was performed until the solution was homogeneous. This solution was used to knife-coat about a 400 μm thick film onto a glass plate. The solvent was evaporated at a temperature of 120–140° C. The glass plate with the thin polymeric film was placed in a trough addition of LiCl, in dipolar-aprotic solvents, and the solvent is evaporated from the solutions, wherein the $SO_3H$, $PO_3H_2$ or COOH form of the blends is prepared by aftertreating the blend polymer or the blend polymer membrane indiluted mineral acids at temperatures of from 20 to 80° C.

2. The process according to claim 1, characterized in that said acidic polymers are selected from the group consisting of polyetheretherketones, polyethersulfones, polyphenylsulfones, polyphenylene sulfides, polyphenylene oxides and combinations thereof.

3. The process according to claim 1, characterized in that said polymeric sulfonic acid, phosphonic acid or carboxylic acid salts to be reacted with said polymers containing imidazole groups or benzimidazole groups are selected from polymers having aromatic core structures of formulas R1 or R2 as repeating units, where

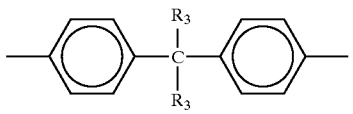

(R₁)

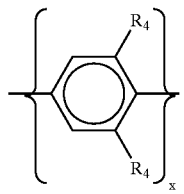

(R₂)

wherein

R₃ is hydrogen, trifluoromethyl or $C_nH_{2n+1}$, n=1 to 10,

R₄ is hydrogen, $C_nH_{2n+1}$, n=1 to 10, and x=1, 2 or 3 which are connected via bridge groups R₅, R₆, R₇ or R₈, where

R₅ is —O—,

R₆ is —SO₂—,

R₇ is >C═O, and

R₈ is —S—[, especially:

poly(etheretherketones) with ([R₅—R₂—R₅—R₂—R₇—R₂]ₙ; x =1, x=1, R₄=H)

poly(ethersulfones) ([R₁—R₅—R₂—R₆—R₂—R₅]ₙ; R₂: x=1, R₄=H), poly(ethersulfones) ([R₂—R₆—R₂—R₅]ₙ; R₂: x =1, R₄=H), poly(phenylsulfones) ([(R₂)₂—R₅—R₂—R₆—R₂]ₙ; R₂: x=2, R₄=H), poly(etherethersulfones) ([R₅—R₂—R₅—R₂—R₆]ₙ—[R₅—R₂—R₆—R₂]m; R₂: x=1, R₄=H, =n/m=0,18), poly(phenylenesulfides) ([R₂—R₈]n; R₂: x=1, R₄=H); and/or poly(phenyleneoxides) ([R₂—R₅]ₙ; R₄=CH₃)].

4. The process according to claim 1, wherein the heterocyclic nitrogen containing moieties are heteroaromatic moieties selected from the group consisting of oxazole, isoxazole, carbazole, indole, isoindole, thiazole, isothiazole, benzoxazole, benzothiazole, imidazolidine, indazole, 1,2,3-oxadiazole, 1,2,3-thiadiazole, 1,2,4-thiadiazole, 1,2,3-triazole, benzotriazole, 1,2,4-triazole, tetrazole, pyrrole, pyrrolidine, and pyrrazole groups.

5. The process according to claim 3, wherein R3 is methyl and R4 is methyl or phenyl.

6. The process according to claim 3, wherein said polymeric sulfonic acid, phosphonic acid or carboxylic acid salts to be reacted with said polymers containing imidazole groups or benzimidazole groups are selected from poly(etherketones) with ([R₅—R₂—R₅—R₂—R₇—R₂]ₙ; x=1, R₄=H)

poly(ethersulfones) ([R₁—R₅—R₂—R₆—R₂—R₅]ₙ; R₂: x=1, R₄=H), poly(ethersulfones) ([R₂—R₆—R₂—R₅]ₙ; R₂: x=1, R₄=H), poly(phenylsulfones) ([(R₂)₂—R₅—R₂—R₆—R₂]ₙ; R₂: x=2, R₄=H), poly(etherethersulfones) ([R₅—R₂—R₅—R₂—R₆]ₙ—[R₅—R₂—R₆—R₂]m; R₂: x=1, R₄=H, n/m=0,18)

poly(phenylenesulfides) ([R₂—R₈]ₙ; R₂: x=1, R₄=H); and/or poly(phenyleneoxides) ([R₂—R₅]ₙ; R₄═CH₃).

7. The process according to any one of claims 1 to 3 or 4 to 6, characterized in that a polymeric sulfonic acid, phosphonic acid or carboxylic acid is first dissolved in a dipolar-aprotic solvent, an equimolar amount, corresponding to the polymer's content of acid groups, of a primary, secondary or tertiary amine is added, then a basic polymer containing imidazole groups or benzimidazole groups or heterocyclic, nitrogen-containing basic moieties in solid form or dissolved in a dipolar-aprotic solvent is added, and the latter polymer is also dissolved in the solution.

8. The process according to claims 2, characterized in that a further polymer containing primary, secondary or tertiary basic nitrogen groups is added to and dissolved in said solution of the polymeric sulfonic acid or polymeric sulfonic acid salt, polymeric phosphonic acid or polymeric phosphonic acid salt, polymeric carboxylic acid or polymeric carboxylic acid salt and the basic polymer containing imidazole groups or benzimidazole groups and/or other heterocyclic, especially heteroaromatic, nitrogen-containing basic moieties according to claim 1.

9. The process according to any one of claims 1–3 or 4–6, characterized in that a further polymer containing primary, secondary or tertiary basic nitrogen groups is added to and dissolved in said solution of the polymeric sulfonic acid or polymeric sulfonic acid salt, polymeric phosphonic acid or polymeric phosphonic acid salt, polymeric carboxylic acid or polymeric carboxylic acid salt and the basic polymer containing imidazole groups or benzimidazole groups or other heterocyclic, nitrogen-containing basic moieties.

10. Acid-base polymer blends or acid-base polymer blend membranes, obtained by a process according to claim 9.

11. The process according to claim 9, characterized in that poly[(2,2'-m-phenylene)-5,5'-bibenzimidazole] is used as said basic polymer containing benzimidazole groups.

12. Acid-base polymer blends or acid-base polymer blend membranes, obtained by a process according to claims 1, 2, 3 or 4–6.

13. The process according to claim 12, characterized in that a third polymer is dissolved in the binary polymer solutions prior to said evaporation of the solvent.

14. The process according to claim 13, characterized in that said third polymer is an arylene main chain polymer selected from the group. consisting of polyetheretherketones, polyethersulfones, polyphenylsulfones, polyphenylene sulfides, polyphenylene oxides and combinations thereof and bears primary amino groups.

15. The process according to any one of claims 12, characterized in that poly[(2,2'-m-phenylene)-5,5'-bibenzimidazole] is used as said basic polymer containing benzimidazole groups.

* * * * *